US005238628A

United States Patent [19]

Mori et al.

[11] Patent Number: 5,238,628

[45] Date of Patent: Aug. 24, 1993

[54] METHOD OF PRODUCING A DEFLECTION YOKE CORE

[75] Inventors: Toshihiko Mori; Takaichi Suzuki, both of Sagamihara, both of Japan

[73] Assignee: Mitsubishi Denki Kabushiki Kaisha, Tokyo, Japan

[21] Appl. No.: 865,485

[22] Filed: Apr. 9, 1992

[30] Foreign Application Priority Data

May 21, 1991 [JP] Japan .................................. 3-116127
Aug. 16, 1991 [JP] Japan .................................. 3-205959

[51] Int. Cl.$^5$ ............................................ C04B 35/26
[52] U.S. Cl. ........................................ 264/67; 264/86
[58] Field of Search .................................. 264/67, 86

[56] References Cited

U.S. PATENT DOCUMENTS 1,491,079 3/1924 Champion ............................ 264/67
2,395,295 2/1946 Rowland .............................. 264/67
5,013,500 5/1991 Hamanaka ............................ 264/67

FOREIGN PATENT DOCUMENTS 1004304 9/1965 United Kingdom .................. 264/67

*Primary Examiner*—James Derrington
*Attorney, Agent, or Firm*—Oblon, Spivak, McClelland, Maier & Neustadt

[57] ABSTRACT

A shaped product having a shape corresponding to a flare-like deflection yoke core is formed from clay as a raw material of ferrite by a wet molding method; parting grooves are formed in the inner or outer circumferential surface of the shape product while it is green; and the thus obtained shaped product is dried and calcined, whereby a deflection yoke core is produced.

3 Claims, 4 Drawing Sheets

METHOD OF PRODUCING A DEFLECTION YOKE CORE

BACKGROUND OF THE INVENTION

1. Field of the Invention

The present invention relates to a method of producing a deflection yoke core used for color TVs, display monitors and so on.

2. Discussion of Background

FIG. 4 is a front view partly broken of a typical deflection yoke core. In FIG. 4, reference numeral 1 designates a deflection yoke core having a flare shape which is formed by sintering a molded body made of ferrite powder, numeral 2 designates parting grooves formed in the outer circumferential surface and the inner circumferential surface of the deflection yoke core 1 at positions opposing to each other so that the deflection yoke core 1 can be divided into two portions, numerals 3, 4 designate core halves splitted at the parting grooves 2 and numerals 5 and 6 designate openings for clipping which are formed in the core halves 3, 4 at both sides of the parting grooves 2.

The deflection yoke core 1 is divided into the core halves 3, 4 at the parting grooves 2 after the calcination of the core 1, each of the core halves 3, 4 is wound with a wire. Then, the core halves are combined into a single body. Clips are used to clip the opposing grooves 5, 6 for clipping. Thus, the deflection yoke core 1 is assembled.

In a conventional method of producing the above-mentioned molded product for the deflection yoke core 1, a metal mold in which projections are previously formed at positions corresponding to the parting grooves 2 and openings 5, 6 for clipping, is used. Ferrite powder as a raw material is put into the metal mold, and the powder is pressurized to thereby form a molded product having the parting grooves 2 and the openings 5, 6 for clipping. The molded product is calcined at a high temperature of a thousand and several hundreds centigrades to thereby obtain the deflection yoke core 1.

The deflection yoke core 1 obtained by the above-mentioned pressing method has a disadvantage that it is easily deformed in the calcination due to its having a small specific gravity and uneven packing density to thereby cause poor dimensional accuracy. In order to improve such a disadvantage, an attempt of employing a wet molding method with use of a lathe has been made.

FIG. 5 is a diagram showing a method of shaping with the use of a lathe. In FIG. 5, reference numeral 21 designates a bowl-shaped plaster mold, numeral 22 designates a clay as raw material for a molded product, numeral 23 designates a rotating trowel made of metal, numeral 24 designates a deburring knife and numeral 25 designates a molded product. The method of shaping with use of a lathe is generally used for shaping clay into a cylindrical container with bottom. The method of shaping with a lathe will be explained.

The plaster mold 21 as shown in FIG. 5*a* is prepared. The clay as a raw material 22 is put into the plaster mold 21 as shown in FIG. 5*b*. The rotating trowel of metal 23 is pushed to the clay 22 while the plaster mold 21 is rotated, so that the clay 22 is spreaded along the inner surface of the plaster mold 21 during which water component in the clay is absorbed by the plaster mold 21, and an excessive amount of clay extending above plaster mold 21 is removed by the deburring knife 24 (FIGS. 5*c* and 5*d*). Thus, a molded product as a container is completed. Then, as shown in FIG. 5*e*, the molded product 25 is heated along with the plaster mold 21. Then, the absorption of water component to the plaster mold 21 and the drying of the molded product can be accelerated. As a result of the drying, the molded product 25 is shrinked as shown in FIG. 5*f*, whereby the molded product can be easily removed from the plaster mold 21 as shown in FIG. 5*g*. The removed molded product 25 is subjected to drying and calcining operations to thereby obtain the final product of container.

However, when the above-mentioned wet molding method is carried out with use of a lathe, it is impossible to form the parting grooves 2 in a surface of the molded product to which the rotating trowel is applied because it is necessary to push the rotating trowel to the inner circumferential surface or the outer circumferential surface of the molded product. Of course, the parting grooves can be formed in the surface of the molded product, which faces the corresponding surface of the plaster mold. However, when the molded product in which the parting grooves are formed only in one surface of the product, is calcined, and the calcined molded product is divided at the parting grooves, there occurs burrs in the surface where no parting grooves are formed. If the burrs come into contact with a coil portion formed on the reflection yoke, the insulating layer of the coil may be broken.

The method of producing a molded product with use of a lathe in association with a rotating trowel has the following disadvantage. Such method can be easily used for shaping a molded product of a bottomed container. However, in a case of forming a molded product of a cylindrical shape with both ends opened such as the deflection yoke core 1, the rotating trowel 23 comes to contact with the plaster mold 21 to thereby wear the plaster mold, and accordingly, stable shaping operation can not be obtained.

SUMMARY OF THE INVENTION

It is an object of the present invention to provide a method of producing a deflection yoke core having parting grooves in the inner and outer circumferential surface and free from the occurrence of burrs when it is separated into core halves, even when a molded product of the deflection yoke core is produced by a wet molding method.

In accordance with the present invention, there is provided a method of producing a deflection yoke core which comprises shaping clay as a raw material of ferrite by a wet molding method into a molded product having a shape corresponding to a deflection yoke core, forming parting grooves in the inner circumferential surface or the outer circumferential surface of the molded product while the molded product is green, and drying and calcining the molded product.

In accordance with the present invention, there is provided a method of producing a deflection yoke core which comprises shaping clay as a raw material of ferrite into a molded product by a wet molding method with use of a plaster mold in which projections corresponding to parting grooves to be formed in the outer circumferential surface of the molded product are formed, whereby the molded product having a shape corresponding to a deflection yoke core is formed forming parting grooves in the inner circumferential surface of the molded product while it is green, and drying and calcining the molded product.

In accordance with the present invention, there is provided a method of producing a deflection yoke core which comprises shaping clay as a raw material of ferrite by a wet molding method with use of a lathe, into a molded product having a shape corresponding to a deflection yoke core with a bottom plate which is connected through a thin-walled portion to the small-diameter side opening of the deflection yoke core, forming parting grooves in the inner circumferential surface or the outer circumferential surface of the molded product while the molded product is green, drying the molded product, and separating the bottom plate from the thin-walled portion before or after calcining the molded product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
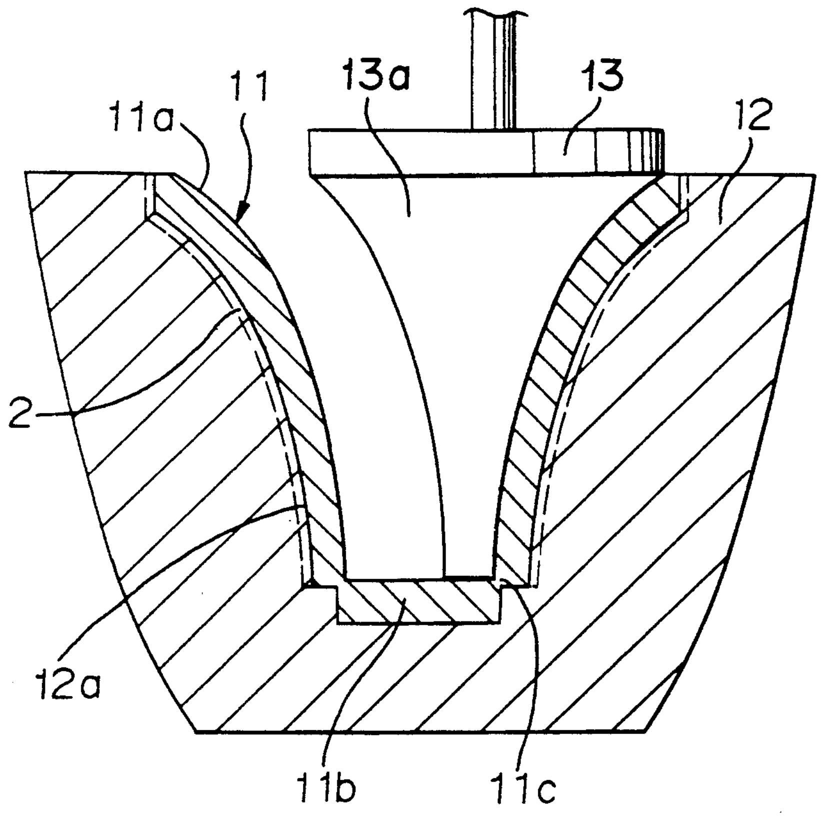
FIG. 1 is a cross-sectional view showing an embodiment of the method of producing a molded product with use of a lathe in association with a rotating trowel.
Figure 2A:
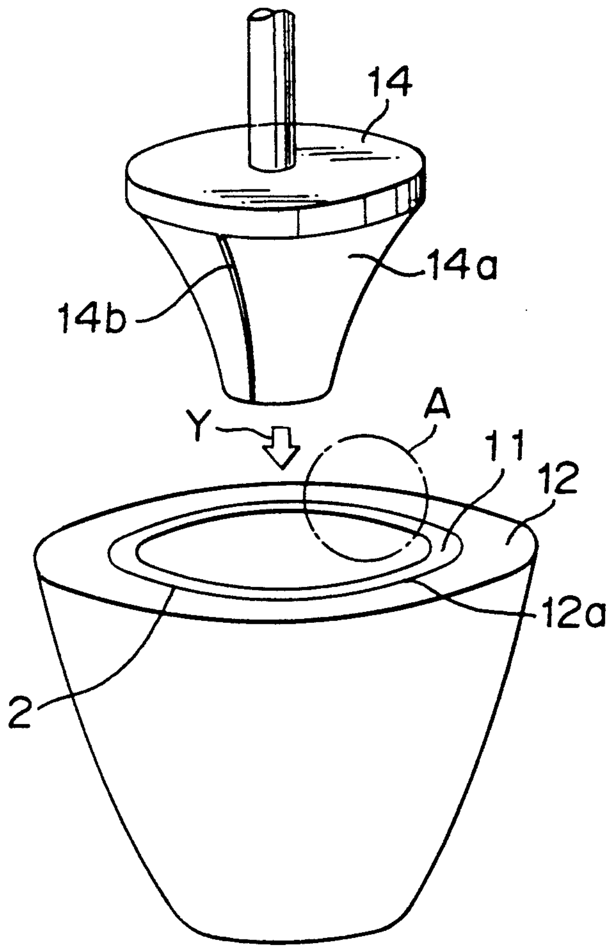
FIG. 2*a* is a perspective view showing a step of forming parting grooves in accordance with an embodiment of the method of producing a deflection yoke core.
Figure 2B:
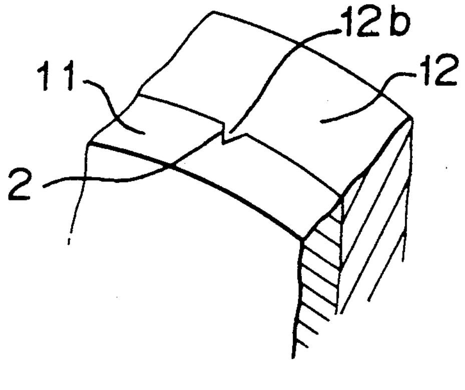
FIG. 2*b* is an enlarged view partly broken of FIG. 2*a;*
Figure 3A:
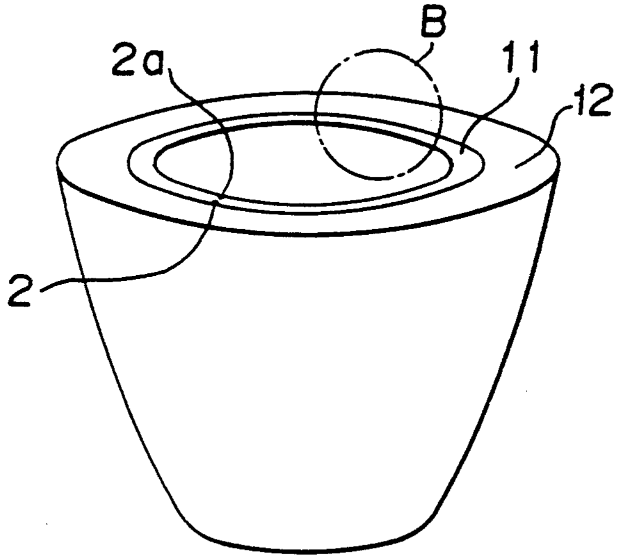
FIG. 3 is a perspective view showing the formation of the parting grooves.
FIG. 3*b* is an enlarged view of a portion B in FIG. 3*a;*
Figure 3B:
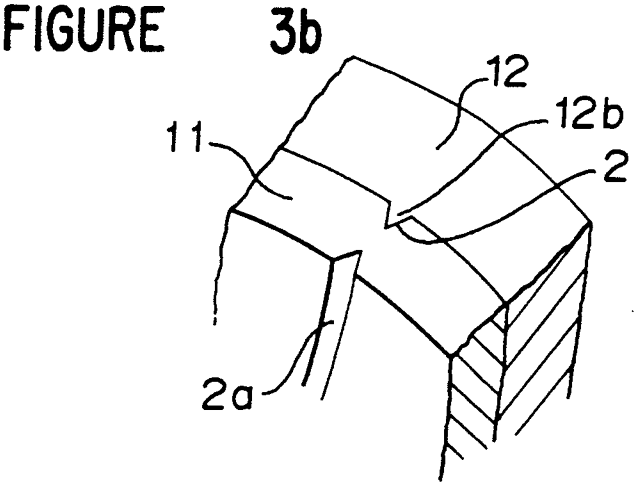

Referring to the drawings wherein the same reference numerals designate the same or corresponding parts, and more particularly to FIGS. 1 through 3, there is shown an embodiment of the method of producing a molded product for a deflection yoke core 1.

Figure 4:
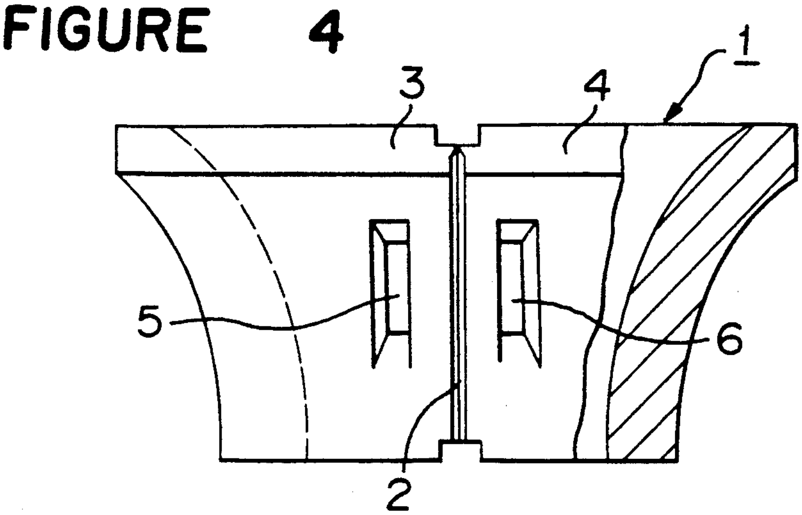
FIG. 4 is a front view partly cross-sectioned of a deflection yoke core.
Figures 5A, 5B, 5C, 5D, 5E, 5F, 5G:
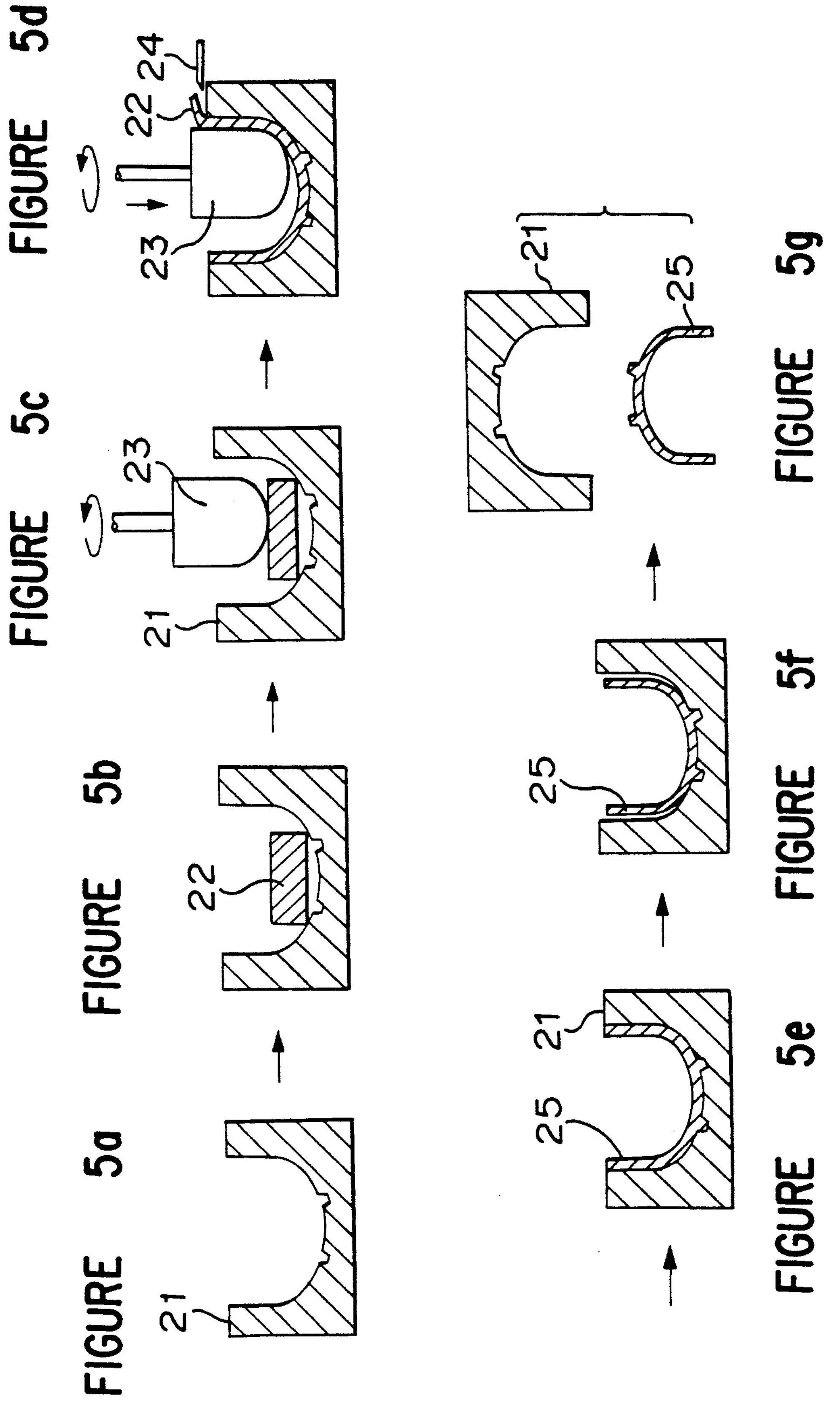
FIGS. 5*a* through 5*g* show sequential steps by the method of shaping with use of a lathe.

In FIG. 1, reference numeral 11 designates a shaped product having a shape corresponding to the deflection yoke core 1, as shown in FIG. 4, in which a bottom plate portion 11*b* is formed to close the small diameter opening of a flare-like core portion 11*a*, the bottom plate portion 11*b* being connected to the core portion 11*a* through a thin-walled portion 11*c*. Numeral 12 designates a plaster mold in a bowl-like shape having a molding surface 12*a*, as an inner surface, which corresponds to the outer circumferential surface of the molded product 11 and projecting portions 12*b* (FIG. 2(*b*)) at positions corresponding to the parting grooves 2 to be formed in the outer circumferential surface of the molded product 11. Numeral 13 designates a rotating trowel which has a cone-like pushing surface 13*a* corresponding to the inner surface of the shaped product 11. The inner circumference of the rotating trowel 13 is made slightly smaller than the inner circumference of the shaped product 11. Numeral 14 designates a groove forming mold which has substantially the same shape as the rotating trowel 13 except that projecting portions 14*b* corresponding to the parting grooves 2*a* to be formed in the inner circumferential surface of the shaped product 11 are formed in the pushing surface 14*a*.

In accordance with the present invention, the deflection yoke core 1 is produced as follows. Clay as a raw material of ferrite is put into a plaster mold 12 as shown in FIG. 1. The rotating trowel 13 of metal is relatively rotated by rotating the plaster mold 12 to urge the clay to the inner circumferential surface of the plaster mold 12, whereby the clay is extended onto the molding surface 12*a* of the mold 12. Then a water component in the clay is absorbed by the plaster mold 12 and a shaped product 11 is formed as shown in FIG. 1.

The shaped product 11 formed by a lathe-forming process has in the outer circumferential surface the grooves 2 corresponding to the projecting portions 12*b* of the plaster mold 12 as shown in FIGS. 2*a* and 2*b*, but it has no parting groove in the inner circumferential surface. Therefore, in a parting groove forming process before the shaped product 11 is dried, parting grooves 2*a* are formed in the inner circumferential surface with use of the groove forming mold 14 in place of the rotating trowel as shown in FIG. 2. In this case, the groove forming mold 14 should be positioned so that the projecting portions 14*b* are brought to positions opposing the parting grooves 2*a*. Then, the groove forming mold 14 is moved in the arrow mark direction Y so as to push the projecting portions 14*b* to the inner circumferential surface of the shaped product 11. As a result, the parting grooves 2*a* are formed in the inner circumferential surface of the shaped product 11 as shown in FIG. 3. In this case, since the shaped product 11 is in a green state, hence, it is soft and has a low distortion resistance, the parting grooves 2*a* can be easily formed.

After the parting grooves 2, 2*a* have been formed, the shaped product 11 is heated along with the plaster mold 12, whereby the water component is absorbed into the plaster mold and the drying of the shaped product 11 is accelerated. Then, the shaped product 11 is shrinked and it can be easily removed from the plaster mold 12.

When the deflection yoke core 1 as shown in FIG. 4 is produced by processing the shaped product 11 obtained as described above, the bottom plate portion 11*b* may be separated from the core portion 11*a* by cutting the thin-walled portion 11*c* and only the core portion 11*a* is calcined. Alternatively, the shaped product 11 may be calcined and then, the bottom plate portion 11*b* is separated from the core portion 11*c* by cutting the thin-walled portion 11*c*. The thus produced deflection yoke core 1 is divided into core halves by separating it at the parting grooves 2, 2*a*. In this case, since the parting grooves 2, 2*a* are formed in both inner and outer circumferential surfaces, there is no burrs occurring when the deflection yoke core 1 is separated.

The shaped product is in a state of green just after the molding operation. Accordingly, it is soft and has a low distortion resistance, accordingly, the parting grooves can be easily formed.

Since the shaped product 11 formed by the lathe-forming method is homogeneous, there is obtainable a deflection yoke core 1 having highly accurate dimensions and high roundness because there is little change of density even when the parting grooves are formed while the shaped product 11 is green, and the deformation by calcining is small because the shaped product is as a whole homogeneous.

Further, since the specific gravity of the shaped product 11 is larger than a shaped product produced by a conventional powder molding, a deflection yoke core 1 having excellent characteristics can be obtained. In the case that the shaped product 11 with the bottom plate portion **11*b* is calcined and the bottom plate portion 11*b*** is separated after the calcination, the deformation of the product at the time of calcination is prevented. Accordingly, accuracy in dimensions can further be improved.

Although, in the above-mentioned embodiment, the shaped product 11 is formed by using the lathe-forming method and the bowl-like plaster mold 12, the shaped product may be formed around the outer circumferential surface of a cylindrical plaster mold. In this case, the cylindrical plaster mold having projecting portions in the outer circumferential surface is used to form parting grooves in the inner circumferential surface of the shaped product, and then, the parting grooves are formed with use of a groove forming mold in the outer circumferential surface of the shaped product while it is green.

Further, in the above-mentioned embodiment, the parting grooves are formed by pushing the groove forming mold having the projecting portions. However, the parting grooves may be formed by cutting the shaped product with use of a cutting tool.

In accordance with the above-mentioned first invention, the parting grooves are formed in the shaped product formed by a wet molding method while the shaped product is green. Accordingly, the parting grooves can be formed in the inner and outer circumferential surfaces of the shaped product even when a method of shaping in which a lathe is used is employed wherein a rotating trowel is pushed to the shaped product. Accordingly, there is obtainable a deflection yoke core free from occurrence of burrs when the shaped product is separated into two halves.

Further, since the deflection yoke core thus formed is homogeneous and has a relatively large specific gravity, it has excellent characteristics in comparison with a shaped product obtained by a conventional press-molding technique, and can provide accurate dimensions.

In accordance with the second invention, the process forming the parting grooves can be simplified in addition to the above-mentioned characteristic features since a plaster mold is used to form a group of the parting grooves.

In accordance with the third invention, the shaped product has a bottom plate portion at a position corresponding to the small diameter opening of the deflection yoke core, and the bottom plate portion is removed before and after the calcination. Accordingly, the deflection yoke core can be easily and effectively produced even by using a lathe-forming method.

Obviously, numerous modifications and variations of the present invention are possible in light of the above teachings. It is therefore to be understood that within the scope of the appended claims, the invention may be practiced otherwise than as• specifically described herein.

What is claimed is:

1. A method of producing a deflection yoke core which comprises the steps of:

shaping ferrite raw material by a wet molding method into a molded product having a shape corresponding to a deflection yoke core;

forming parting grooves in an inner circumferential surface and an outer circumferential surface of the molded product while the molded product is green; and drying and calcining the molded product.

2. A method of producing deflection yoke core which comprises the steps of:

shaping ferrite raw material into a molded product by a wet molding method with use of a plaster mold in which projections corresponding to parting grooves to be formed in an outer circumferential surface of the molded product are formed, whereby the molded product having a shape corresponding to a deflection yoke core is formed;

forming parting grooves in an inner circumferential surface of the molded product while it is green; and drying and calcining the molded product.

3. A method of producing a deflection yoke core which comprises the steps of:

shaping ferrite raw material by a wet molding method with use of a lathe, into a molded product having a shape corresponding to a deflection yoke core with a bottom plate which is connected through a thin-walled portion to the small-diameter side opening of the deflection yoke core;

forming parting grooves in an inner circumferential surface and an outer circumferential surface of the molded product while the molded product is green;

drying the molded product; and separating the bottom plate from the thin-walled portion before or after calcining the molded product.

* * * * *